United States Patent [19]

Chicoye et al.

[11] 4,180,589

[45] * Dec. 25, 1979

[54] PREPARATION OF A BLAND BEER

[75] Inventors: Etzer Chicoye, Milwaukee, Wis.; J. Raymond Helbert, Waukegan, Ill.; James F. Rice, Milwaukee, Wis.

[73] Assignee: Miller Brewing Company, Milwaukee, Wis.

[*] Notice: The portion of the term of this patent subsequent to Jan. 10, 1995, has been disclaimed.

[21] Appl. No.: 865,358

[22] Filed: Dec. 28, 1977

Related U.S. Application Data

[63] Continuation-in-part of Ser. No. 750,509, Dec. 14, 1976, Pat. No. 4,068,005, which is a continuation-in-part of Ser. No. 622,001, Oct. 14, 1975, abandoned.

[51] Int. Cl.$^2$ ............................................. C12C 11/04
[52] U.S. Cl. ......................................... 426/11; 426/16
[58] Field of Search ............................ 426/11, 16, 477

[56] References Cited

U.S. PATENT DOCUMENTS

| | | | |
|---|---|---|---|
| 3,332,779 | 7/1967 | Knabbe et al. | 426/16 |
| 3,798,331 | 3/1974 | Barisotto et al. | 426/16 |
| 3,908,021 | 9/1975 | Rehberger et al. | 426/16 |
| 3,911,139 | 10/1975 | Wolter et al. | 426/16 |
| 4,021,580 | 5/1977 | Raymond et al. | 426/16 |
| 4,068,005 | 1/1978 | Chicoye et al. | 426/16 |
| 4,123,475 | 3/1964 | Wendt et al. | 426/16 |

OTHER PUBLICATIONS

Rice et al., The Quantitative Influence of Agitation on Yeast Growth During Fermentation, ASBC Proceedings, 1974, pp. 94–96.

Hind, A. L., Brewing Science and Practice, vol. II, Chapman & Hall, London, 1950, pp. 679, 783–785 & 839–847.

Rice et al., Inhibition of Beer Volatiles Formation by Carbon Dioxide Pressure, J. of the American Society of Brewing Chemists, vol. 35, No. 1, 2/1977.

*Primary Examiner*—David M. Naff

[57] ABSTRACT

A method of preparing a lager beer having a mild, bland, less aromatic character comprises conducting the fermentation of the wort for about 60 to 200 hours under suitable conditions to maintain the dissolved carbon dioxide concentration in the fermenting wort at about 2.1 to about 4.0 cc of dissolved carbon dioxide per cc of wort. In a preferred embodiment, the fermentation of the wort is conducted at a temperature of 60° to 85° F. with an appropriate overpressure of from 5 to 40 psig of carbon dioxide. The beer thus obtained has a mild character and can be used, if desired, as a base for flavored beverages.

3 Claims, 2 Drawing Figures

DISSOLVED CO₂ DURING ACTIVE FERMENTATION AT VARIOUS RPM'S

PREPARATION OF A BLAND BEER

RELATED APPLICATION

This is a continuation-in-part of our copending application Ser. No. 750,509 filed Dec. 14, 1976, now U.S. Pat. No. 4,068,005, which is in turn the continuation-in-part of our earlier application Ser. No. 622,001 filed Oct. 14, 1975, now abandoned.

BACKGROUND OF THE INVENTION

There is a continuing interest in the preparation of lager beer having a more mild or bland character than conventional lager beer. One reason for the interest is that there appears to be substantial potential market for flavored beers which are prepared by adding a non-beer flavor to a bland relatively flavorless beer base.

Flavored beers have been marketed for many years in Europe. In Germany a mixture of beer and concentrated raspberry juice is preferred; in France a blend of beer and lemonade or limeade is popular; in England "shandy", a mixture of beer and lemonade or lime juice is available; and in Belgium mixtures of beer and cherry juice and beer and grenadine syrup are sold.

Another reason that there is a continuing interest in the preparation of a bland beer is that there is a substantial number of persons who presently do not drink beer because they dislike its characteristic taste. These persons are potential consumers of a bland beer.

Historically, there are two general methods of fermenting malt beverages. For the production of ale-type beers, a top-fermentation process is used which utilizes a species of yeast which tends to rise to the surface of the fermenting wort. The temperature during top-fermentation is conventionally regulated at about 15°–20° C. (58°–68° F.) throughout the most active period of fermentation. For the production of lager-type beers, a bottom-fermentation process is used which utilizes a species of yeast that remains more or less uniformly suspended throughout the fermenting wort during active fermentation by natural agitation created by ascending $CO_2$ bubbles, then settles to a more or less compact layer on the bottom of the fermentation vessel as fermentation reaches completion. The temperature during a bottom-fermentation is conventionally regulated at about 10°–15° C. (50°–58° F.) during active fermentation.

It is known that if the temperature during a lager beer fermentation is increased, the fermentation will be accelerated. However, the beer thus obtained has an undesirable winey flavor which is not typical of a lager beer. This winey off-flavor is known to be related to increased amounts of beer volatile compounds, variously known as fusel or "higher" alcohols and esters.

In our earlier applications, Ser. No. 622,001, filed Oct. 14, 1975, now abandoned, and Ser. No. 750,509, filed Dec. 14, 1976, now U.S. Pat. No. 4,068,005 we disclosed a method of reducing the length of time required to prepare a normal tasting lager beer which method comprised conducting the fermentation at an elevated temperature while maintaining the dissolved carbon dioxide concentration in the fermenting wort at about 1.5 to about 2.0 cc of fermenting wort by use of an appropriate $CO_2$ overpressure of about 2 to about 20 psig. The formation of the winey flavored volatiles which normally result from the use of elevated temperatures in lager fermentation is suppressed when the dissolved carbon dioxide levels are maintained within the described limits.

Our earlier applications contain an extensive discussion of prior practices relating to the fermentation of lager beer and are incorporated by reference herein.

SUMMARY OF THE INVENTION

It is an object of the present invention to disclose a method of preparing a bland, relatively flavorless lager beer which can be used as a base in the preparation of flavored beers.

It is a further object of the present invention to disclose a method of preparing a bland beer which might appeal to persons who dislike the taste of conventional lager beer.

We have now discovered that a bland lager beer can be prepared by fermenting the wort under conditions which maintain the dissolved carbon dioxide concentration in the fermenting wort at about 2.1 cc to about 4.0 cc per cc of wort. The beer which is obtained by the practice of our invention is milder than that obtained by either conventional fermentation methods of the accelerated process described in our earlier applications.

DETAILED DESCRIPTION OF THE INVENTION

In the preferred embodiment of our present invention the fermentation of the wort is conducted at a temperature of 60°–85° F. utilizing an appropriate overpressure of carbon dioxide selected from 5 to about 40 psig of carbon dioxide so that the dissolved carbon dioxide concentration in the fermenting wort is maintained in the desired range of about 2.1 to about 4.00 cc of dissolved carbon dioxide per cc of fermenting wort. The fermentation is normally completed within about 60 to about 200 hours.

The proper choice of carbon dioxide ($CO_2$) overpressure requires knowledge of the influence of both temperature and $CO_2$ overpressure upon the degree of $CO_2$ supersaturation which prevails during the active phase of lager fermentations. We have discovered the quantitative relationships of these fermentation parameters of temperature and $CO_2$ overpressure upon the level of $CO_2$ supersaturation, and thus we can calculate the $CO_2$ overpressure necessary to establish the desired dissolved $CO_2$ concentration during a fermentation at any temperature within the range of 60° to 85° F.

We have further related the influence of the fermentation parameters of $CO_2$ overpressure, temperature, and exogenous agitation level upon the dissolved $CO_2$ concentration in lager fermentations.

Figure 1:
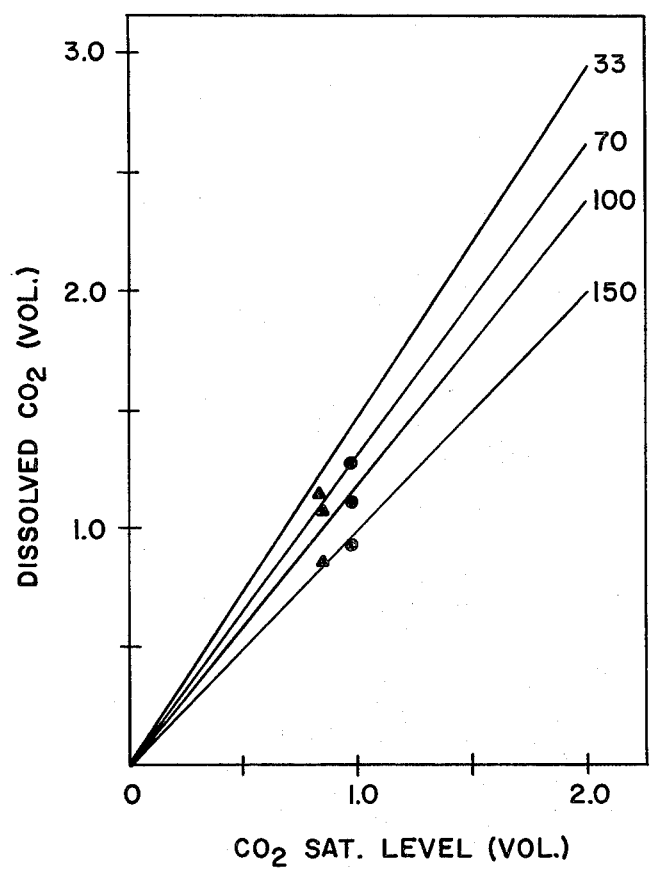

We have found that, while the dissolved $CO_2$ concentration during active fermentation is influenced by both $CO_2$ overpressure and fermentation temperature, the supersaturation is constant, at a given level or agitation, regardless of the fermentation temperature or $CO_2$ overpressure. The dissolved $CO_2$ concentration is, of course, influenced inversely by temperature and directly by pressure. The dissolved $CO_2$ concentration at saturation for a wide range of temperature and $CO_2$ pressure conditions is available in the literature. The dissolved $CO_2$ level actually present in the fermentation is proportionately greater because of supersaturation, and it is this degree of supersaturation which is constant at a given level of agitation, regardless of temperature or $CO_2$ overpressure. This is shown graphically in FIG. 1.

Figure 2:
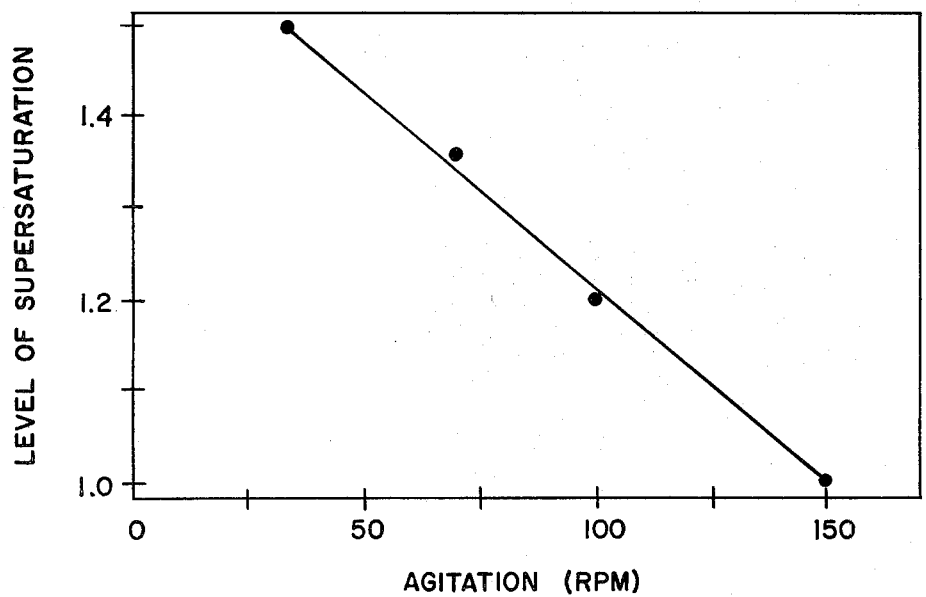

The degree of agitation controls the level of supersaturation and there is an inverse linear relationship between the degree of supersaturation and agitation as shown in FIG. 2.

Thus, using the quantitative relationships we have described, it is possible to accurately predict the effect of altering any of three fermentation parameters—$CO_2$ overpressure, temperature, and agitation upon the dissolved $CO_2$ concentration prevailing during fermentation. For example, if it is desired to shorten fermentation time by use of exogenous agitation, we can predict the effect of the selected level of agitation upon supersaturation, and thus we are able to calculate the $CO_2$ overpressure required to adjust the dissolved $CO_2$ concentration during the fermentation of the desired level.

The necessary $CO_2$ overpressure required to maintain the dissolved $CO_2$ level in the fermentation liquid at the desired level can be calculated by the following formula in which the rate of agitation approximates agitation caused by the natural evolution of carbon dioxide:

Dissolved $CO_2$ during fermentation = $1.5 \times$ dissolved $CO_2$ at saturation.

Thus, by dividing the desired dissolved $CO_2$ concentration during fermentation by 1.5, the saturation level of dissolved $CO_2$ is determined. With both the fermentation temperature and the saturation level of dissolved $CO_2$ known, the required $CO_2$ overpressure is obtained from the literature. Since the effect of the level of agitation upon supersaturation is known, these conditions of temperature and $CO_2$ overpressure will result in the desired $CO_2$ level.

GENERAL PROCEDURE USED IN EXAMPLES

A series of fermentations were run to demonstrate the utility and effectiveness of the invention. The fermentation vessel used in the experiments was a 130 liter stainless steel vessel with a working capacity of 100 liters; cylindrical, about 33 inches high and 17 inches inside diameter. It was equipped with pressure cap, temperature and pressure gauges, vapor inlet and exit lines, and liquid discharge spigot at the bottom. It was provided with an external cooling/heating jacket and with turbine-type impellers and baffles. The arrangement permitted precise control of agitation, temperature, and headspace pressure over a wide range.

A commercial 15.7° Plato wort was employed having a 35/65 malt-adjunct ratio with the adjunct being 65% commercial corn grits and 35% commercial brewers' syrup.

The commercial wort, both aerated and pitched with a commercial strain of lager yeast (*Saccharomyces uvarum*) in production equipment in the conventional manner, was aseptically transferred from a 1000-barrel commercial fermentor after 20 hours at 52°–53° F. to the $CO_2$-packed, 100 liter fermentor. This assured that the procedures prior to fermentation did not deviate from conventional commercial practice. The 20 hour residence in the commercial fermentor prior to transfer corresponds approximately to the yeast lag phase, during which little yeast growth takes place, but during which the oxygen, added during aeration, is absorbed, preparatory to growth. If this delay in transfer had not been used, $CO_2$ pressurizing in the 100 liter fermentor would have had to be delayed to assure this oxygen absorption.

Temperature, agitation and carbon dioxide counterpressure conditions were immediately established and maintained throughout the fermentation. Fermentation was judged completed when both carbohydrate assimilation ceased (at an acceptably low residual level) and diacetyl concentration decreased to 0.10 part per million. Both of these conditions are conventional criteria of the final completion of lager fermentation.

Yeast growth (as dry weight concentrations), dissolved $CO_2$ and degree of attenuation (as specific gravity) were measured at intervals throughout the fermentations.

The following examples illustrate the practice of the invention:

EXAMPLE 1

In this example conventional fermentation conditions are used. Henceforth, it will be referred to as a "normal" fermentation.

One hundred liters of conventional wort (15.7° Plato) aerated and pitched at about 10 million cells/cc, were fermented at a constant 60° F. (15.5° C.) with low level agitation (35 rpm) and no $CO_2$ overpressure. The yeast concentration reached a maximum of 7.35 grams/liter (dry weight basis). The maximum dissolved $CO_2$ concentration recorded was 1.40. About 190 hours were required to complete the fermentation. The raw beer obtained had a conventional lager beer taste.

EXAMPLE 2

The procedure of Example 1 was repeated except that a counterpressure of 20.0 psig of carbon dioxide was employed. Henceforth, Example 2 will be referred to as a "high-pressure normal-temperature" fermentation. The yeast concentration reached a maximum of 5.80 grams/liter (dry weight basis). The maximum dissolved $CO_2$ concentration recorded was 3.56. About 190 hours were required to complete the fermentation. The beer obtained was less fruity than the beer of Example 1.

EXAMPLE 3

The procedure of Example 1 was repeated, except that the temperature was increased to 72° F. to accelerate the fermentation and a counterpressure of 20.0 psig of carbon dioxide was employed. Henceforth, Example 3 will be referred to as a "high-pressure, high-temperature" fermentation. The yeast concentration reached a maximum of 6.75 grams/liter (dry weight basis). The maximum dissolved $CO_2$ concentration recorded was 2.63. About 125 hours were required to complete the fermentation. The beer obtained was less fruity than the beers of either Example 1 or Example 2.

The fermentation characteristics of Examples 1, 2 and 3 are shown in Table I. As can be seen from the data in Table I, with the high levels of $CO_2$ pressure, the dissolved $CO_2$ levels were greater, the maximum yeast growth levels were less, and the fermentation time was not affected by the $CO_2$ pressure unless accompanied by an elevated temperature. The degree of $CO_2$ supersaturation was not affected by either $CO_2$ pressure or the fermentation temperature.

The analytical methods used to evaluate the beer were the following:

1. Gas-Liquid Chromatography (GLC) of Volatiles
   Two techniques were used, each with its own advantages.
   They were:
   a. Carbon Disulfide Extraction of the organic compounds from beer which both separates and concentrates a relatively large number of constituents.
  b. Headspace Analysis which measures those constituents most likely to have an aroma impact.

The GLC procedures are described in detail in our earlier applications.

2. Organoleptic Analysis ("Taste-Testing")
  a. Triangular Taste-Testing which determines if a trained panel of testers can distinguish between two beers.
  b. Quantitative Descriptive Analysis (QDA) which measures the level of the various organoleptic characteristics of the beers.

The QDA procedure is described in detail in McCredy, J. M., Sorremann, J. C., and Lahmann, S. J., *Food Technology* 28, 36–41 (1974).

In Table II, it can be seen that the two Gas Liquid Chromatography (GLC) methods do not always show the same concentration of "total volatiles" in the sample. This is at least partially because the components being measured are not all the same in both methods. However, the proportion of the "total volatiles" which is a certain type of compound, e.g., higher alcohols, is very similar in the same sample when measured by both methods. It is the balance of compounds more than the amount which determines the aroma and taste.

When the balance or proportion of total volatiles of the different beers is compared as in Table III, it is seen that:

1. There is little difference between the beer of the commercial fermentation and the beer of the "normal" fermentation in the 100 liter fermentor of Example 1. That is, the balance of volatiles is the same except for acetaldehyde (which is present in all beers at very low levels—below taste threshold). There are less total volatiles in the commercial fermentation.

2. The "high-pressure, normal-temperature" fermentation of Example 2 results in a beer which contains less total volatiles than the beer of the "normal" fermentation and also the balance of volatile components is very different—the esters are present in lower proportion in the "high-pressure, normal-temperature" beer. This is important because the esters have a much lower threshold and probably contribute most of the fruity character. However, even in absolute amounts, all components are decreased in the beer of the "high-pressure, normal-temperature" fermentation.

3. The "high-pressure, high-temperature" fermentation of Example 3 results in a beer which contains even less total volatiles than the beer of Example 2. The balance of the various volatile components is even more different from that of the "normal" beer. Furthermore, the ester proportion is also lower than that of Example 2.

Table IV shows the taste-test results. It should be noted that there is good correlation between taste-test results and GLC analyses. The results indicate that:

1. No difference was found between the commercial and the "normal" beers of Example 1 by triangular taste tests.

2. The triangular taste panel test results indicated that there was a significant difference between the "high-pressure, normal-temperature" beer of Example 2 and the "normal" beer of Example 1. The QDA data showed that the "high-pressure, normal-temperature" beer was less fruity.

3. The triangular taste panel test results indicated that there was a very significant difference between the "high-pressure, high-temperature" beer of Example 3 and the "normal" beer of Example 1. The QDA results showed that the "high-pressure, high-temperature" beer had less aroma strength and less fruity character.

TABLE I

FERMENTATION CHARACTERISTICS

| Fermentation No. | Temperature °C. (°F.) | Agitation (rpm) | $CO_2$ Counter-Pressure | Max. Yeast Dry Weight (G/L) | Max. Diss. $CO_2$ (Volumes) | Superstat. Coeff. | HOURS TO REACH: Max. Yeast Growth | Final Attenuation | End of Fermentation |
|---|---|---|---|---|---|---|---|---|---|
| #1 | 15.5 (60) | " | 0 | 7.35 | 1.40 | 1.44 | 110 | 126 | 190 |
| #2 | 15.5 (60) | " | 19.9 | 5.80 | 3.56 | 1.56 | 112 | 126 | 190 |
| #3 | 22.2 (72) | " | 19.9 | 6.75 | 2.63 | 1.41 | 73 | 84 | 125 |

TABLE II

Volatile Components By Two GLC Methods

| | Head-Space GLC | | | | | | | CS$_2$ Extract GLC | | | | | | | |
|---|---|---|---|---|---|---|---|---|---|---|---|---|---|---|---|
| | Volatiles | Higher Alcohols | | Esters | | Acetaldehyde | | Volatiles | Higher Alcohols | | Esters | | Acids* | |
| Example | PPM | PPM | % Total Volatile | PPM | % Total | PPM | % Total Volatile | PPM | PPM | % Total Volatile | PPM | % Total Volatile | PPM | % Total Volatile |
| Commercial | 184.7 | 136.7 | 74.0 | 45.7 | 24.7 | 2.16 | 1.17 | 151.6 | 110.0 | 72.6 | 33.4 | 22.0 | 8.20 | 5.4 |
| 1 | 208.9 | 159.9 | 73.2 | 54.0 | 25.8 | 1.57 | 0.75 | 181.7 | 128.1 | 70.5 | 45.4 | 25.0 | 8.15 | 4.5 |
| 2 | 143.5 | 115.8 | 80.7 | 23.8 | 16.6 | 3.82 | 2.66 | 121.8 | 97.2 | 79.8 | 18.7 | 15.4 | 5.8 | 4.8 |
| 3 | 120.4 | 99.8 | 82.9 | 17.8 | 14.8 | 2.60 | 2.16 | 118.8 | 99.7 | 83.9 | 13.5 | 11.4 | 5.6 | 4.7 |

*Octanoic And Decanoic Acids

TABLE III

| | Comparison Of Relative Proportion Of Components In Total Volatile | | | | | | | |
|---|---|---|---|---|---|---|---|---|
| | Head-Space GLC | | | | $CS_2$ Extract GLC | | | |
| | Total Volatiles PPM | Higher Alcohols % Total Volatile | Esters % Total Volatile | Acetaldehyde % Total Volatile | Total Volatiles PPM | Higher Alcohols % Total Volatile | Esters % Total Volatile | Acids* % Total Volatile |
| Commercial Example 1 | 0.89 | 1.01 | 0.96 | 1.57 | 0.83 | 1.03 | 0.88 | 1.19 |
| Example 2 Example 1 | 0.69 | 1.10 | 0.64 | 2.43 | 0.67 | 1.13 | 0.62 | 1.07 |
| Example 3 Example 1 | 0.58 | 1.37 | 0.57 | 2.88 | 0.65 | 1.19 | 0.46 | 1.05 |

*Octanoic And Decanoic Acids

TABLE IV

| | ORGANOLEPTIC TEST RESULTS | | | | | | | | | | | |
|---|---|---|---|---|---|---|---|---|---|---|---|---|
| | Triangular Taste Test | | Quantitative Descriptive Analysis (QDA) | | | | | | | | | |
| | No. Correct | Degree of | Aroma Strength | | Fruity-estery | | Grainy | | Sulfitic-Sulfidic | | Sweetness | |
| Comparison | Total No. | Signif-icance | Score | Signif-icance | Score | Signif-icance | Score | Signif-icance | Score | Signif-icance | Score | Signif-icance |
| Commercial vs. Example 1 | 5 / 18 | * | — | — | — | — | — | — | — | — | — | — |
| Example 2 vs. Example 1 | 10 / 16 | 0.95 | 15.1 vs 15.0 | * | 8.9 vs 12.3 | 0.99 | 9.7 vs 6.6 | 0.95 | 7.2 vs 4.2 | 0.95 | 11.4 vs 11.2 | * |
| Example 3 vs. Example 1 | 16 / 17 | 0.999 | 11.7 vs 14.0 | 0.999 | 7.8 vs 11.2 | 0.999 | 6.5 vs 5.7 | * | 5.0 vs 4.9 | * | 8.6 vs 10.1 | 0.99 |

*No Significant Difference Between Beers

The following examples further demonstrate the practice of the present invention.

EXAMPLE 4

One-hundred liters of a 14.1° Plato commercial wort, handled in the manner previously described, were fermented at a constant 72° F. with a constant $CO_2$ overpressure of 14 psig. A constant agitation level of 33 rpm was maintained. The dissolved $CO_2$ concentration of the liquid was 2.35 cc of $CO_2$ per cc of beer.

A total of 102 hours (4.25 days) was required to reach the end of fermentation, based upon the criteria previously described.

Yeast growth reached a maximum of 5.5 grams/liter, dry weight, while total volatiles concentration, relative to the GLC reference standard, was 667. As a result of the lower volatile concentration the flavor was much more bland than a typical lager beer.

EXAMPLE 5

One-hundred liters of a 15.7° Plato commercial wort, handled in the manner previously described, were fermented at a constant 85° F., with a constant $CO_2$ overpressure of 27.5 psig, while maintaining a constant 33 rpm agitation level. The dissolved $CO_2$ concentration of the liquid was 3.0 cc of $CO_2$ per cc of liquid. About 100 hours were required to reach the end of fermentation, based upon the criteria previously described.

Yeast growth reached a maximum of 4.0 grams/liter, dry weight, while total volatiles concentration by GLC headspace analysis was 89 ppm—about 43% of the total volatiles of conventional lager beer. The QDA taste-test results showed the beer to be less fruity or estery than conventional lager beer.

EXAMPLE 6

One-hundred liters of a 15.7° Plato wort, handled in the manner previously described, were fermented at a constant 85° F., with a constant $CO_2$ overpressure of 20.5 psig and a constant agitation level of 33 rpm. The dissolved $CO_2$ concentration was 2.5 cc of $CO_2$ per cc of liquid. The beer was fully fermented in 97 hours, based upon the criteria previously described.

Yeast growth reached a maximum of 4.20 grams per liter, dry weight, while total volatiles concentration as determined by GLC headspace analysis was 83 ppm—about 40% of the total volatiles of conventional lager beer. The QDA taste-test results showed the beer to be less fruity or estery than conventional lager beer.

EXAMPLE 7

One-hundred liters of a 15.7° Plato wort, handled in the manner previously described, were fermented at a constant 60° F., with a constant $CO_2$ overpressure of 7.9 psig, at a constant agitation level of 33 rpm. The dissolved $CO_2$ concentration in the liquid was 2.02 cc of $CO_2$ per cc of liquid. The beer was fully fermented in 196 hours, based upon the criteria previously described.

Yeast growth reached a maximum of 6.4 g/l, dry weight, while total volatiles concentration as measured by GLC headspace analysis was 147 ppm, which is about 70% of the total volatiles of a conventional lager beer. The QDA test results showed the beer to be less fruity or estery than conventional lager beer.

The foregoing Examples demonstrate that the use of the invention with a conventional lager wort produces a beer which is less flavorful than a conventional lager beer. Such a beer may appeal to those persons who dislike the characteristic taste of lager beer or it can be used as a base for a flavored beverage.

The preparation of an even less flavorful beer can be obtained by using a specially formulated wort. Such a wort could have a low level of malt and hops and higher levels of brewers sugar syrups. The wort might also include a yeast nutrient because of its low malt content. It might also be desirable to eliminate the normal boiling of the wort since boiling appears to contribute to beer flavor.

While in the foregoing description we have described fermentations using specific conditions, it is to be understood that the temperature, the agitation or the $CO_2$ overpressure can be varied during the fermentation as long as the desired $CO_2$ concentration level is maintained in the fermenting wort for a suitable length of time to produce the desired product.

We claim:

1. A method of preparing a lager beer having a mild, bland, less aromatic character which comprises placing beer wort in a fermentation vessel and fermenting the wort in said vessel for about 60 to about 200 hours at an elevated temperature of 60° F. to about 85° F. while maintaining the dissolved $CO_2$ concentration in the fermenting wort at about 2.1 to about 4.0 cc per cc of the fermenting wort by use of a $CO_2$ overpressure in the vessel of about 5 to about 40 psig.

2. The method of claim 1 in which the temperature is about 72° F. and the $CO_2$ overpressure is about 20 psig.

3. The method of claim 1 in which as the temperature is increased, the overpressure of $CO_2$ is also increased to maintain the dissolved $CO_2$ concentration at the desired level.